(12) United States Patent
Walker

(10) Patent No.: US 8,919,510 B2
(45) Date of Patent: Dec. 30, 2014

(54) LOCK-UP CLUTCH ASSEMBLY HAVING IMPROVED TORQUE CAPACITY

(75) Inventor: Jason R. Walker, Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 371 days.

(21) Appl. No.: 13/435,513

(22) Filed: Mar. 30, 2012

(65) Prior Publication Data

US 2013/0256075 A1  Oct. 3, 2013

(51) Int. Cl.
 *F16D 33/18* (2006.01)
(52) U.S. Cl.
 USPC .......................................... 192/3.3; 192/3.33
(58) Field of Classification Search
 USPC ........................................ 192/3.29, 3.3, 3.33
 See application file for complete search history.

(56) References Cited

U.S. PATENT DOCUMENTS

| | | | |
|---|---|---|---|
| 3,040,589 A * | 6/1962 | Chapman ...................... | 192/3.3 |
| 3,240,308 A | 3/1966 | Frost | |
| 3,299,636 A | 1/1967 | Kronogard | |
| 4,128,999 A | 12/1978 | Yokoyama et al. | |
| H964 H * | 9/1991 | Olson et al. ................... | 324/174 |
| 5,964,329 A | 10/1999 | Kawaguchi et al. | |
| 6,729,453 B2 | 5/2004 | Uehara | |
| 6,948,606 B2 * | 9/2005 | Ida et al. ..................... | 192/85.45 |
| 6,974,008 B2 * | 12/2005 | Leber ............................. | 192/3.3 |
| 7,837,018 B2 | 11/2010 | Nakamura | |

FOREIGN PATENT DOCUMENTS

| | | |
|---|---|---|
| DE | 102006014773 A1 | 9/2007 |
| FR | 2765939 A1 | 1/1999 |
| GB | 2149891 A | 6/1985 |
| JP | 2008-75861 | 4/2008 |

\* cited by examiner

*Primary Examiner* — Jacob S Scott

(74) *Attorney, Agent, or Firm* — Finnegan, Henderson, Farabow, Garrett & Dunner LLP

(57) ABSTRACT

A lock-up clutch assembly for a torque converter includes a clutch housing defining an annular clutch chamber, and an annular piston received in the clutch chamber and extending between the inner diameter and outer diameter of the clutch chamber. The piston defines inner and outer diameters associated respectively with the inner and outer diameters of the clutch chamber. The assembly further includes a backing plate received in the clutch chamber, and at least one annular friction disk and at least one annular friction plate received in the clutch chamber between the piston and the backing plate. The assembly further includes first and second seal members configured to provide respective fluid seals between the inner diameters of the piston and clutch chamber and between the outer diameters of the piston and clutch chamber.

18 Claims, 3 Drawing Sheets

LOCK-UP CLUTCH ASSEMBLY HAVING IMPROVED TORQUE CAPACITY

TECHNICAL FIELD

The present disclosure relates to a lock-up clutch assembly for a torque converter and, more particularly, to a lock-up clutch assembly having improved torque capacity.

BACKGROUND

It is often desirable to provide a coupling between the rotating output of a prime mover and the rotating input of a driven load that permits a disparity between the rotational speed of the rotating output of the prime mover and the rotating input of the driven load. For example, in order to permit continuous rotation of the output of the prime mover, even when it is desirable to stop rotation of the input of the driven load, it is desirable to provide a coupling that permits the rotational output of the prime mover to continue despite the input of the driven load being stopped.

An example of such a coupling is a torque converter, which provides a hydrodynamic fluid coupling between the rotating output of a prime mover and the rotating input of a driven load. For example, a machine such as a vehicle may include an internal combustion engine and a transmission, with the output of the internal combustion engine coupled to an input of the transmission by the torque converter.

A torque converter generally includes an input coupling for coupling the output of a prime mover to the input of the torque converter, and an output shaft for coupling the output of the torque converter to a driven load, such as a transmission. A torque converter further includes a housing containing fluid, such as hydraulic fluid. Within the housing, the input coupling is coupled to a pump including an impeller for pumping the fluid in the housing. A torque converter further includes a turbine coupled to the output shaft of the torque converter. The impeller of the pump, driven by the input coupling, pumps fluid through the turbine, thereby causing the turbine to rotate and drive the output shaft of the torque converter and the input of, for example, a transmission. By virtue of the fluid coupling provided by the interaction between the impeller and the turbine, the output of the prime mover may continue to rotate the input coupling of the torque converter, even when the output shaft of the torque converter is stopped.

In some situations, it may be desirable to bypass the hydrodynamic fluid coupling between the impeller and the turbine to improve the efficiency of the torque transfer from the prime mover to the output shaft of the torque converter. For example, when the turbine reaches, for example, about 90% or more of the rotational speed of the impeller due to the hydrodynamic interaction between the turbine and impeller, the hydrodynamic coupling may become less efficient than a mechanical coupling between the prime mover and the output shaft of the torque converter. In addition, at such relative speeds, it may no longer be desirable to provide for a relative disparity of rotational speeds between the prime mover and the output shaft of the torque converter.

To improve efficiency, some torque converters include a lock-up clutch that, when activated, bypasses the hydrodynamic fluid coupling and provides a mechanical coupling between the prime mover and the output shaft of the torque converter. For example, a lock-up clutch may include a clutch housing mechanically coupled to the prime mover and friction members mechanically coupling the clutch housing to the output shaft the torque converter. Upon engagement of the lock-up clutch, interaction between the friction members transfers torque between the clutch housing and the output shaft of the torque converter.

Conventional lock-up clutches may suffer from a number of potential drawbacks. For example, the torque transfer capacity of the lock-up clutch is limited by the interaction between the friction members. The interaction between the friction members may be provided by pressing the friction members together, which may be accomplished using pressurized fluid supplied by the torque converter. However, the pressure of the fluid is limited, and thus, the torque carrying capacity of the torque converter may be limited by the fluid pressure. As a result, it may be desirable to provide a lock-up clutch having a higher torque carrying capacity for a given fluid pressure available from the torque converter. Further, it may be desirable to improve the operation of a torque converter while reducing its complexity and/or cost.

An example of a torque converter having a lock-up clutch is described in U.S. Pat. No. 5,964,329 to Kawaguchi et al. ("the '329 patent"). In particular, the '329 patent discloses a lock-up mechanism in a torque converter that includes a clutch portion capable of selective engagement and disengagement between a front cover and a turbine. A piston member forms a sealed oil chamber together with the front cover and selectively engages and disengages the clutch portion in accordance with the change in the oil pressure within the oil chamber.

Although the '329 patent discloses a torque converter having a lock-up clutch to provide a mechanical coupling between the front cover and the turbine, it may suffer from a number of possible drawbacks. For example, the mechanical coupling disclosed in the '329 patent may not be capable of transferring high torque loads between a prime mover and an output shaft of the torque converter due to the design of the lock-up clutch. The assembly and method disclosed herein may be directed to mitigating or overcoming this and other possible drawbacks.

SUMMARY

In one aspect, the present disclosure includes a lock-up clutch assembly for a torque converter. The lock-up clutch assembly includes a clutch housing defining an annular clutch chamber, the clutch chamber defining an inner diameter and an outer diameter. The assembly further includes an annular piston received in the clutch chamber and extending between the inner diameter and outer diameter of the clutch chamber, wherein the clutch housing and the piston define a fluid chamber configured to receive fluid, and wherein the piston defines an inner diameter and an outer diameter associated respectively with the inner and outer diameters of the clutch chamber. The assembly further includes a backing plate received in the clutch chamber, at least one annular friction disk received in the clutch chamber between the piston and the backing plate, and at least one annular friction plate received in the clutch chamber between the piston and the backing plate. The assembly further includes a first seal member configured to provide a fluid seal between the inner diameter of the piston and the inner diameter of the clutch chamber, and a second seal member configured to provide a fluid seal between the outer diameter of the piston and the outer diameter of the clutch chamber. The piston and the clutch housing are configured such that fluid received in the fluid chamber results in the at least one friction disc and the at least one friction plate being pressed together between the piston and the backing plate, such that the clutch housing and a turbine of the torque converter are coupled to one another via the at least one friction disc and the at least one friction plate.

In another aspect, the present disclosure includes a torque converter including a rotating housing configured to be rotated by a prime mover, an impeller coupled to the housing and configured to rotate with the housing and pump fluid, and a turbine configured to rotate as a result of fluid pumped by the impeller. The torque converter further includes an output shaft coupled to the turbine assembly and configured to be rotated by the turbine assembly, and a lock-up clutch assembly configured to selectively provide a mechanical coupling between the prime mover and the output shaft. The lock-up clutch assembly includes a clutch housing coupled to the rotating housing and defining an annular clutch chamber, and the clutch chamber defines an inner diameter and an outer diameter. The assembly further includes an annular piston received in the clutch chamber and extending between the inner diameter and outer diameter of the clutch chamber. The clutch housing and the piston define a fluid chamber configured to receive fluid, and the piston defines an inner diameter and an outer diameter associated respectively with the inner and outer diameters of the clutch chamber. The assembly further includes a backing plate received in the clutch chamber, at least one annular friction disk received in the clutch chamber between the piston and the backing plate, and at least one annular friction plate received in the clutch chamber between the piston and the backing plate. The assembly further includes a first seal member configured to provide a fluid seal between the inner diameter of the piston and the inner diameter of the clutch chamber, and a second seal member configured to provide a fluid seal between the outer diameter of the piston and the outer diameter of the clutch chamber. The piston and the clutch housing are configured such that fluid received in the fluid chamber results in the at least one friction disc and the at least one friction plate being pressed together between the piston and the backing plate, such that the clutch housing and the turbine are coupled to one another via the at least one friction disc and the at least one friction plate.

In still a further aspect, the present disclosure includes a method of increasing a torque transfer capacity of a torque converter lock-up clutch assembly. The method includes providing an annular piston extending between an inner diameter and an outer diameter of a clutch chamber, wherein the piston defines an inner diameter and an outer diameter associated respectively with the inner and outer diameters of the clutch chamber. The method further includes providing seal members at the inner and outer diameters of the annular piston.

DETAILED DESCRIPTION

Figure 1:
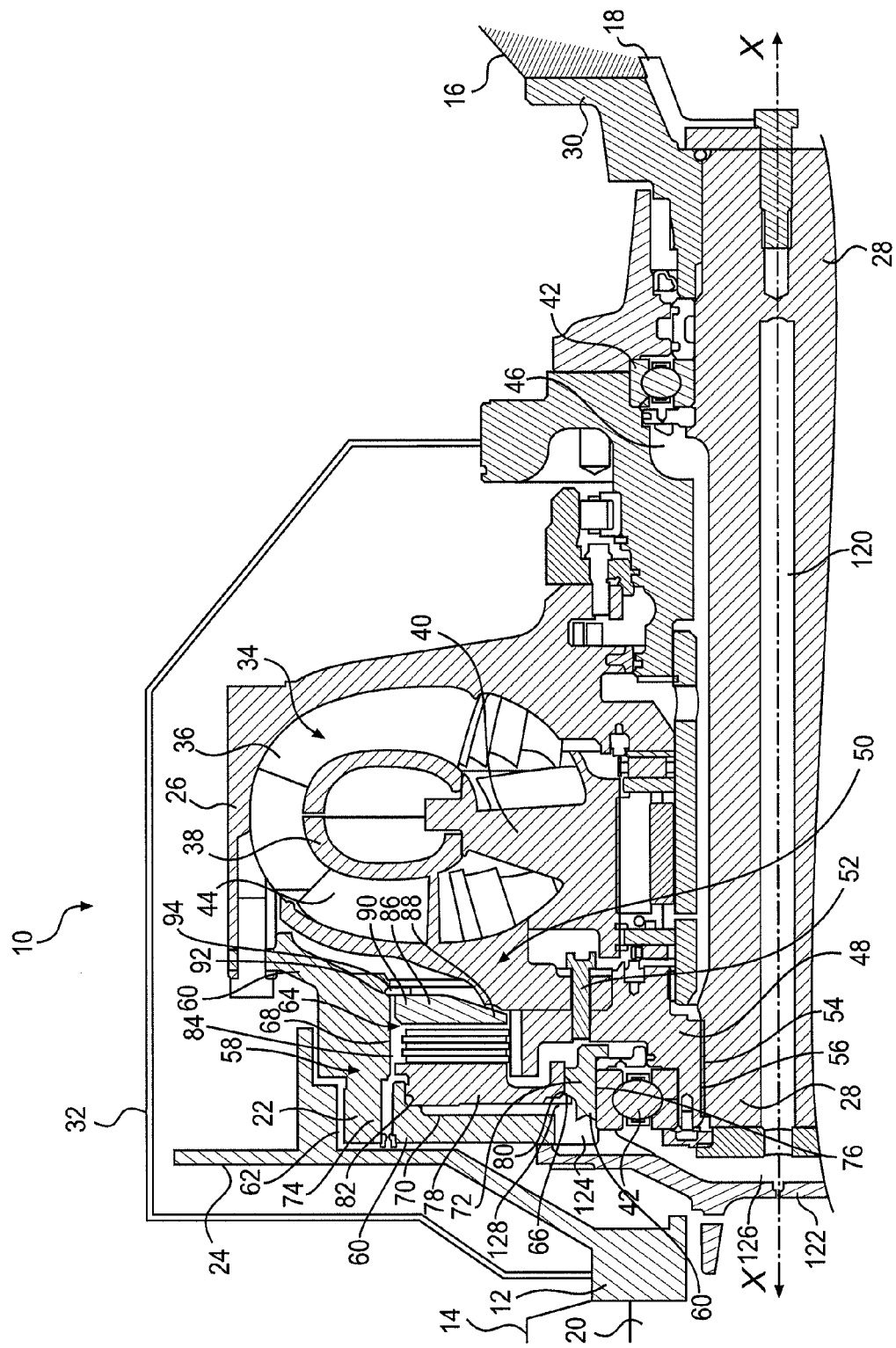
FIG. 1 is a partial section view of an exemplary embodiment of a torque converter.

FIG. 1 is a partial section view of an exemplary embodiment of a torque converter 10 configured to couple an output 12 of a prime mover 14 to an input member 16 of a driven mechanism 18. For example, prime mover 14 may be an internal combustion engine or an electric motor having an output shaft 20 configured to be coupled to an input coupling 22 of exemplary torque converter 10. As shown in FIG. 1, for example, output shaft 20 is coupled to a flywheel 24, which, in turn, is coupled to a rotating housing 26 of exemplary torque converter 10. In the exemplary embodiment shown, flywheel 24, driven by prime mover 14, is coupled to and drives rotating housing 26. Exemplary torque converter 10 includes an output shaft 28 coupled to input member 16 of driven mechanism 18 via an output yoke 30. Driven mechanism 18 may be an input of a machine such as, for example, a transmission of a machine such as a vehicle, pump, compressor, or generator, or any other machine configured to be driven by a prime mover.

In the exemplary embodiment shown in FIG. 1, torque converter 10 includes a housing 32 configured to house the moving parts of torque converter 10, as well as fluid used to provide a fluid coupling between input member 16 and output shaft 28 of torque converter 10. Housing 32 contains rotating housing 26, which is coupled to a pump 34 having an impeller 36 configured to pump fluid within rotating housing 26. Torque converter 10 further includes a turbine 38 opposite impeller 36. Turbine 38 is coupled to output shaft 28, for example, via a splined coupling, such that as turbine 38 rotates, output shaft 28 also rotates. Exemplary torque converter 10 shown in FIG. 1 further includes a stator 40 configured to re-direct fluid exiting turbine 38 back to impeller 36 of pump 34 to improve efficiency. Output shaft 28 rotates about longitudinal axis X on a pair of bearings 42 located at opposite ends of output shaft 28, with bearings 42 being mounted in a fixed manner relative to housing 32 of torque converter 10.

During operation, prime mover 14 rotates flywheel 24, which is coupled to rotating housing 26 of torque converter 10, thereby driving rotating housing 26. Impeller 36 of pump 34, being coupled to rotating housing 26, rotates about longitudinal axis X and pumps fluid through turbine 38. Turbine 38 includes a plurality of vanes 44 configured to rotate turbine 38 about longitudinal axis X as fluid flows through vanes 44. Turbine 38, by virtue of being coupled to output shaft 28 of torque converter 10, drives output shaft 28, which is coupled to driven mechanism 18 by output yoke 30. Thus, the interaction of the fluid being pumped through turbine 38 by impeller 36 provides a hydrodynamic fluid coupling between prime mover 14 and driven mechanism 18.

The hydrodynamic fluid coupling permits output 12 of prime mover 14 to rotate at a different speed than input member 16 of driven mechanism 18. For example, for machines such as vehicles, prime mover 14 may operate at a relatively low speed while input member 16 of the transmission is held in a stopped condition (e.g., by operation of brakes of the vehicle). Pump 34 of torque converter 10 pumps fluid through turbine 38, but by holding input member 16 in a stopped condition, the energy of the pumped fluid can be absorbed by heating of the fluid rather than turning turbine 38. However, if input member is no longer held in a stopped condition, fluid pumped through turbine 38 causes it to rotate, thereby rotating output shaft 28 of torque converter 10. As the speed of output 12 of prime mover 14 is increased, pump 34 of torque converter 10 pumps fluid through turbine 38 at an increasing rate, thereby causing turbine 38 and output shaft 28 to rotate at an increasing rate.

In the exemplary embodiment shown, output shaft 28 rotates about longitudinal axis X on bearings 42. Housing 32 includes a lubricating passage 46 configured to supply the bearing 42 located at the end of output shaft 28 adjacent output yoke 30 of torque converter 10. Lubricant may be provided under pressure to ensure sufficient lubrication and cooling of bearing 42. For example, lubricant may be supplied to bearing 42 at about 70 pounds per square inch (psi).

Figure 2:
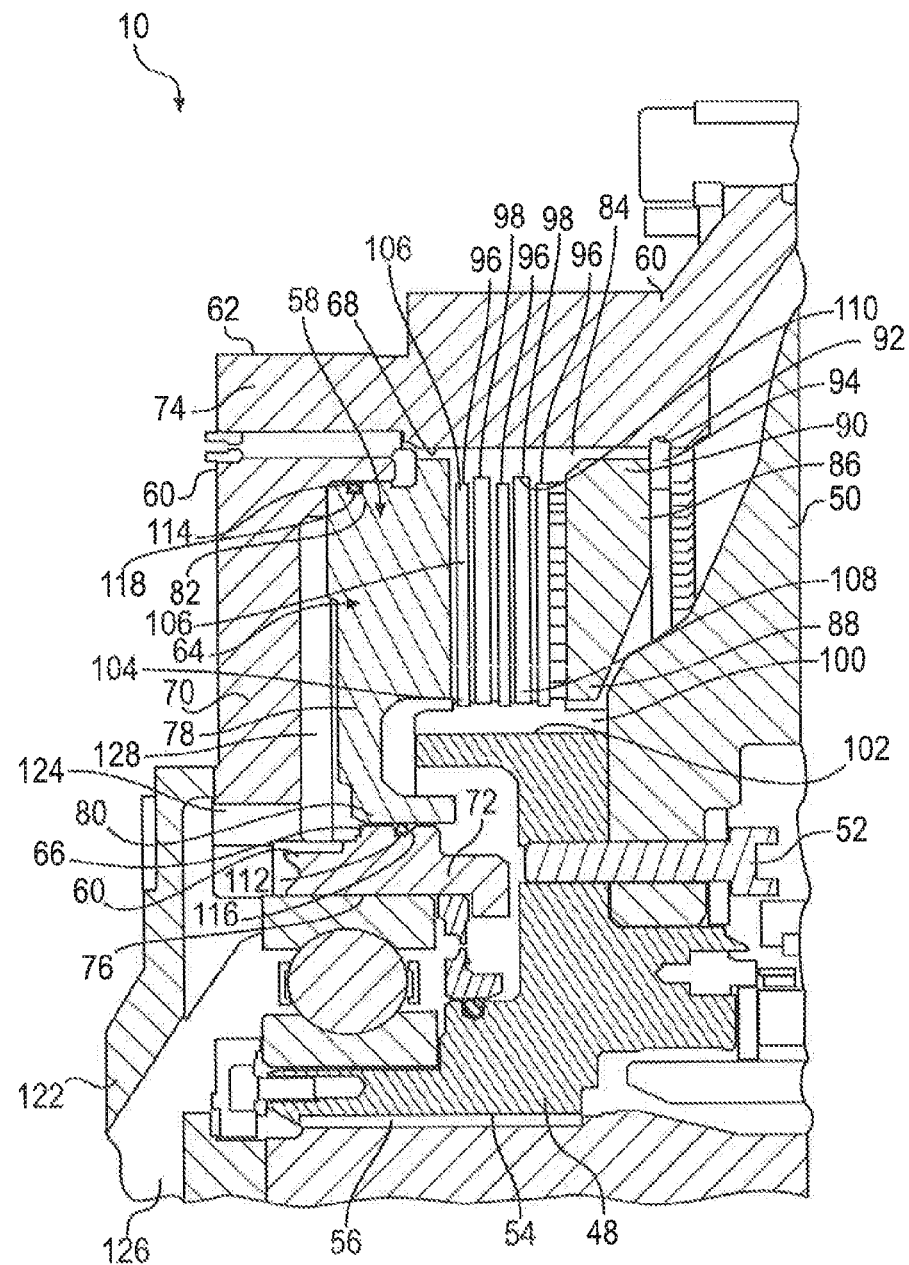
FIG. 2 is a partial section view of a portion of the exemplary embodiment shown in FIG. 1.

As shown in FIG. 2, exemplary turbine 38 includes a turbine hub 48 and a turbine wheel 50 coupled to one another via a plurality of fasteners 52 (e.g., bolts). Exemplary turbine wheel 50 includes vanes 44, which are configured to receive fluid flow from pump 34 and cause turbine wheel 50 to rotate. Exemplary turbine hub 48 is configured to transfer torque from turbine wheel 50 to output shaft 28. According to some embodiments, turbine hub 48 may be coupled to output shaft 28 via a splined coupling. For example, exemplary turbine hub 48 defines an inner bore 54 provided with splines 56 configured to engage corresponding splines (not shown) on output shaft 28. When in an assembled condition, output shaft 28 is received through inner bore 54 of turbine hub 48.

Exemplary torque converter 10 includes a lock-up clutch assembly 58. Lock-up clutch assembly 58 is configured to bypass the hydrodynamic fluid coupling provided by interaction between impeller 36 and turbine 38 and selectively provide a mechanical coupling between prime mover 14 and output shaft 28 of torque converter 10. For example, exemplary lock-up clutch assembly 58 includes an annular clutch housing 60 coupled to flywheel 24 of prime mover 14 via, for example, a splined coupling 62, although other types of couplings known to those skilled in the art are contemplated. Clutch housing 60 is also selectively coupled to turbine hub 48 by lock-up clutch assembly 58, which, in turn, is coupled to output shaft 28, such that a mechanical coupling may be selectively provided between flywheel 24 and output shaft 28 by operation of lock-up clutch assembly 58.

As shown in FIG. 2, exemplary clutch housing 60 of lock-up clutch assembly 58 defines an annular clutch chamber 64 defining an inner diameter 66 and an outer diameter 68. For example, clutch housing 60 includes a radially extending face member 70, an inner flange 72 extending longitudinally from face member 70, and an outer flange 74 extending longitudinally from face member 70. Face member 70, inner flange 72, and outer flange 74 define clutch chamber 64. Inner diameter 66 of clutch chamber 64 is defined by inner flange 72, and outer diameter 68 of clutch chamber 64 is defined by outer flange 74. In the exemplary embodiment shown, clutch housing 60 defines a bore 76 in which bearing 42 is received. Thus, with exemplary lock-up clutch assembly 58 in a disengaged state, clutch housing 60 rotates about output shaft 28 on bearing 42.

Exemplary lock-up clutch assembly 58 includes an annular piston 78 received in clutch chamber 64. Exemplary piston 78 extends between inner diameter 66 and outer diameter 68 of clutch chamber 64 with an inner diameter 80 of piston 78 being adjacent inner diameter 66 of clutch chamber 64 and an outer diameter 82 of piston 78 being adjacent outer diameter 68 of clutch chamber 64. Piston 78 is located at a longitudinal end of clutch chamber 64 adjacent face member 70. Outer diameter 68 of clutch chamber 64 defines a plurality of splines 84, and outer diameter 82 of piston 78 includes corresponding splines (not shown) configured to engage with splines 84, such that piston 78 is permitted to slide longitudinally on splines 84 (to the left and right direction as shown in FIGS. 1 and 2) in a reciprocating manner. Splines 84 and corresponding splines of piston 78 result in piston 78 rotating about output shaft 28 via an engaged coupling with clutch housing 60. In addition, splines 84 and corresponding splines of piston 78 may serve to guide piston 78 as it reciprocates in clutch chamber 64 during engagement and disengagement of lock-up clutch assembly 58. According to some embodiments, inner diameter 80 of piston 78 does not include any splines. According to some embodiments, inner diameter 66 of clutch chamber 64 does not include any splines.

Exemplary lock-up clutch assembly 58 includes a backing plate 86 at a longitudinal end of clutch chamber 64 opposite piston 78. Backing plate 86 extends between inner diameter 66 and outer diameter 68 of clutch chamber 64 with an inner diameter 88 of backing plate 86 being adjacent inner diameter 66 of clutch chamber 64 and an outer diameter 90 of backing plate 86 being adjacent outer diameter 68 of clutch chamber 64. As shown in FIG. 2, outer diameter 68 of clutch chamber 64 defines an annular recess 92 receiving therein an annular retaining ring 94. Retaining ring 94 is configured to prevent backing plate 86 from moving away from piston 78 relative to clutch chamber 64. Outer diameter 90 of backing plate 86 includes splines (not shown) configured to engage with splines 84 of clutch chamber 64, such that backing plate 86 rotates about output shaft 28 via an engaged coupling with clutch housing 60. According to some embodiments, inner diameter 88 of backing plate 86 does not include any splines.

In the exemplary embodiment shown, lock-up clutch assembly 58 includes one or more annular friction disks 96 and one or more annular friction plates 98 received in clutch chamber 64 between piston 78 and backing plate 86. For example, exemplary lock-up clutch assembly 58 includes three friction disks 96 and two friction plates 98 positioned between pairs of friction disks 96 in an alternating manner. Other numbers of friction disks 96 and friction plates 98 are contemplated. Friction disks 96 and friction plates 98 include opposing surfaces of friction material configured to prevent slip between adjacent friction disks and friction plates when they are pressed together with sufficient force, such that friction disks 96 and friction plates 98 rotate together at substantially the same speed (e.g., the same speed) when engaged with one another. Thus, lock-up clutch assembly 58 can be said to be engaged when friction disks 96 and friction plates 98 are pressed together, and disengaged when friction disks 96 and friction plates 98 are not pressed together with sufficient force to rotate at substantially the same speed or the same speed.

Exemplary friction disks 96 include splines (not shown) configured to engage with one or more splines 100 defined by an outer surface 102 of turbine hub 48. In particular, exemplary friction disks 96 define an inner diameter 104 and an outer diameter 106. Inner diameters 104 of friction disks 96 include one or more splines (not shown) configured to engage with splines 100 of turbine hub 48, such that friction disks 96 are permitted to slide longitudinally on splines 100 (to the left and right direction as shown in FIGS. 1 and 2) in a reciprocating manner. This engagement results in friction disks 96 rotating about output shaft 28 via an engaged coupling with turbine hub 48. In addition, splines 100 of outer surface 102 of turbine hub 48 and corresponding splines of friction disks 96 may serve to guide friction disks 96 as they reciprocate in clutch chamber 64 during engagement and disengagement of lock-up clutch assembly 58. In the exemplary embodiment shown, outer diameters 106 of friction disks 96 do not include any splines and are not physically coupled to clutch housing 60.

Exemplary friction plates 98 include splines (not shown) configured to engage with one or more splines 84 defined by outer diameter 68 of clutch chamber 64. In particular, exemplary friction plates 98 define an inner diameter 108 and an outer diameter 110. Outer diameters 110 of friction plates 98 include one or more splines (not shown) configured to engage with splines 84 of outer diameter 68 of clutch chamber 64, such that friction plates 98 are permitted to slide longitudinally on splines 84 (to the left and right direction as shown in FIGS. 1 and 2) in a reciprocating manner. This engagement results in friction plates 98 rotating about output shaft 28 via an engaged coupling with clutch housing 60. In addition, splines 84 and corresponding splines of friction plates 98 may serve to guide friction plates 98 as they reciprocate in clutch chamber 64 during engagement and disengagement of lock-up clutch assembly 58. In the exemplary embodiment shown, inner diameters 108 of friction plates 98 do not include any splines and are not physically coupled to turbine hub 48.

Lock-up clutch assembly 58 includes a first inner seal member 112 and a second outer seal member 114 configured to provide a fluid seal, respectively, between inner diameter 80 of piston 78 and inner diameter 66 of clutch chamber 64, and between outer diameter 82 of piston 78 and outer diameter 68 of clutch chamber 64. For example, inner diameter 66 of clutch chamber 64 defines a first annular groove 116 receiving inner seal member 112, which provides a fluid seal between piston 78 and inner diameter 66. Outer diameter 82 of piston 78 defines a second annular groove 118 receiving outer seal member 114, which provides a fluid seal between piston 78 and outer diameter 68 of clutch chamber 64. In the exemplary embodiment shown, inner seal member 112 and outer seal member 114 are separated from one another by substantially the entire radial distance between inner diameter 66 and outer diameter 68 of clutch chamber 64.

As shown in FIG. 1, output shaft 28 includes a longitudinally extending passage 120, and torque converter 10 includes an end cap 122 coupled to clutch housing 60. Clutch housing 60 defines one or more passages 124 adjacent face member 70 and inner flange 72 providing flow communication between piston 78 and passage 120 of output shaft 28 via a cap chamber 126 defined by end cap 122. In particular, face member 70 and piston 78 define an annular fluid chamber 128 configured to receive fluid from passage 120 via cap chamber 126 and one or more passages 124. In the exemplary embodiment shown, fluid chamber 128 extends substantially the entire radial distance between inner diameter 66 and outer diameter 68 of clutch chamber 64 and/or substantially the entire radial distance between inner diameter 80 and outer diameter 90 of piston 78.

Figure 3:
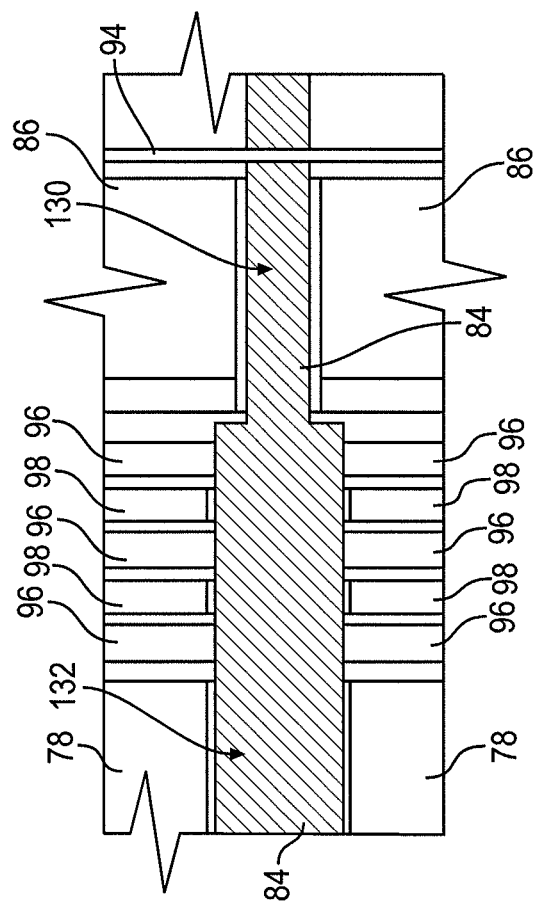
FIG. 3 is a partial section view of a portion of the exemplary embodiment shown in FIG. 2.

As shown in FIG. 3, according to some embodiments, at least some (e.g., all) of splines 84 of outer diameter 68 of clutch chamber 64 define a thickness that changes in the longitudinal direction, such that the backing plate 86 is prevented from moving toward piston 78 relative to the clutch chamber 64. As shown in FIG. 3, at least some of splines 84 have a first thickness at a longitudinal position 130 corresponding to backing plate 86 and a second thickness at a longitudinal position 132 corresponding to friction plates 98 and piston 78, such that the first thickness is less than the second thickness. This exemplary configuration prevents backing plate 86 from moving toward piston 78 when lock-up clutch assembly 58 is in the disengaged condition, and thus, prevents backing plate 86 from pressing against friction disks 96 and friction plates 98. This prevents creation of undesirable friction losses from lock-up clutch assembly 58 due to unintended friction between friction disks 96, friction plates 98, and backing plate 86 when lock-up clutch assembly 58 is disengaged.

When exemplary lock-up clutch assembly 58 is disengaged, torque converter 10 provides a hydrodynamic fluid coupling between prime mover 14 and output shaft 28 of torque converter 10 by virtue of interaction between impeller 36 and turbine 38. In the disengaged state, piston 78 of lock-up clutch assembly 58 does not press friction disks 96 and friction plates 98 together. In particular, fluid is not supplied to fluid chamber 128 with sufficient pressure to cause piston 78 to move toward backing plate 86. As a result, friction disks 96 and friction plates 98 do not engage one another and do not rotate together. Rather, friction disks 96 are coupled to and rotate with clutch housing 60, and friction plates 98 are coupled to and rotate with turbine hub 48. As a result, to the extent that impeller 36 and turbine 38 are rotating at different speeds due to the hydrodynamic fluid coupling, friction disks 96 and friction plates 98 also rotate at different speeds.

To engage exemplary lock-up clutch assembly 58 and bypass the hydrodynamic fluid coupling, fluid is supplied under pressure to fluid chamber 128 (e.g., at about 300 pounds per square inch), which causes piston to 78 to move in clutch chamber 64 toward backing plate 86 (to the right as shown in FIGS. 1 and 2), thereby pressing friction disks 96 and friction plates 98 together between piston 78 and backing plate 86. With sufficient pressure, friction material of friction disks 96 and friction plates 98 causes friction disks 96 and friction disks 98 to rotate at substantially the same speed (e.g., the same speed). Friction plates 98 are engaged with splines 84 of outer diameter 68 of clutch chamber 64, and thus, as clutch housing 60 is driven by prime mover 14, friction plates 98 rotate with clutch housing 60. Because friction disks 96 are engaged with friction plates 98, friction plates 98 drive friction disks 96 at substantially the same speed as friction plates 98, clutch housing 60, and prime mover 14. Friction disks 96 are engaged with splines 100 of outer surface 102 of turbine hub 48, and thus, as friction disks 96 are driven by friction plates 98, turbine hub 48 rotates with friction disks 96, friction plates 98, clutch housing 60, and prime mover 14, thereby resulting in a mechanical coupling between clutch housing 60 and output shaft 28, which is coupled to turbine hub 48. As a result, the hydrodynamic fluid coupling provided by interaction between impeller 36 and turbine 38 is bypassed.

INDUSTRIAL APPLICABILITY

Exemplary lock-up clutch assembly 58 disclosed herein may provide improved torque transfer capacity. For example, although some torque converters include a lock-up clutch to improve efficiency by providing a mechanical coupling between a prime mover and the output shaft of the torque converter, the lock-up clutch may have a lower torque carrying capacity than desired. Exemplary lock-up clutch assembly 58 increases the effective area against which fluid pressure can be applied to piston 78, thereby increasing the magnitude of the force applied to friction disks 96 and friction plates 98. In particular, seal members 112 and 114 are provided at opposite radial ends of annular piston 78, thereby increasing the area against which fluid pressure may be applied against piston 78. The torque carrying capacity of a lock-up clutch depends on the amount of friction that can be transferred between the friction members. The amount friction may be proportional to the magnitude of the force that presses the friction members together, and the magnitude of the force may be proportional to the magnitude of the fluid pressure available in the torque converter multiplied by the area against which the pressure is acting. It is generally not possible to increase the maximum pressure available to the torque converter without costly modification, and thus, by increasing the area against which the fluid pressure is applied, the magnitude of the force against piston 78 may be increased. Thus, by providing seal members 112 and 114 at opposite radial ends of piston 78, the magnitude of the force applied to friction disks 96 and friction plates 98 is increased, thereby increasing the torque transfer capacity of exemplary lock-up clutch assembly 58 without increasing the fluid pressure.

According to some embodiments, exemplary lock-up clutch assembly 58 may be less complex and/or less costly to manufacture. For example, some embodiments include a splined coupling between clutch housing 60 and piston 78, friction plates 98, and backing plate 86 at outer diameter 68 of clutch chamber 64, but do not include a splined coupling between inner diameter 80 of piston 78 and inner diameter 66 of clutch chamber 64. By not having a splined coupling at inner diameter 66, the complexity and/or cost of lock-up clutch assembly 58 may be reduced. However, the splined coupling between clutch housing 60 and piston 78, friction plates 98, and backing plate 86 at outer diameter 68 of clutch chamber 64 may provide smooth operation of piston 78 as it reciprocates in clutch chamber 64, due to the guided motion provided by the splined coupling at outer diameter 68 of clutch chamber 64.

According to some embodiments, lock-up clutch assembly 58 may provide more efficient operation when not engaged. Some lock-up clutches may suffer from reduced efficiency when not engaged due to parasitic losses as friction members drag against one another in an unintended manner. Some embodiments of lock-up clutch assembly 58 may reduce or eliminate such parasitic losses by preventing backing plate 86 from moving toward piston 78 relative to the clutch chamber 64 when lock-up clutch assembly 58 is disengaged. By virtue of splines 84 having a configuration that prevents backing plate 86 from moving toward piston 78, backing plate 86 is prevented from pressing against friction disks 96 and friction plates 98, which, in turn, prevents creation of undesirable friction losses from lock-up clutch assembly 58 due to unintended friction between friction disks 96, friction plates 98, and backing plate 86.

It will be apparent to those skilled in the art that various modifications and variations can be made to the exemplary disclosed systems and methods. Other embodiments will be apparent to those skilled in the art from consideration of the specification and practice of the exemplary disclosed embodiments. It is intended that the specification and examples be considered as exemplary only, with a true scope being indicated by the following claims and their equivalents.

What is claimed is:

1. A lock-up clutch assembly for a torque converter, the lock-up clutch assembly comprising:
    a clutch housing defining an annular clutch chamber, the clutch chamber defining an inner diameter and an outer diameter;
    an annular piston received in the clutch chamber and extending between the inner diameter and outer diameter of the clutch chamber, the clutch housing and the piston defining a fluid chamber configured to receive fluid, wherein the piston defines an inner diameter and an outer diameter associated respectively with the inner and outer diameters of the clutch chamber;
    a backing plate received in the clutch chamber;
    at least one annular friction disk received in the clutch chamber between the piston and the backing plate;
    at least one annular friction plate received in the clutch chamber between the piston and the backing plate;
    a first seal member configured to provide a fluid seal between the inner diameter of the piston and the inner diameter of the clutch chamber;
    a second seal member configured to provide a fluid seal between the outer diameter of the piston and the outer diameter of the clutch chamber,
    wherein the piston and the clutch housing are configured such that fluid received in the fluid chamber results in the at least one friction disc and the at least one friction plate being pressed together between the piston and the backing plate, such that the clutch housing and a turbine of the torque converter are coupled to one another via the at least one friction disc and the at least one friction plate, and
    wherein the outer diameter of the clutch chamber defines a plurality of radially extending splines that define a thickness and extend longitudinally from the piston to the backing plate, the thickness of at least some of the splines of the clutch chamber changing, such that the backing plate is prevented from moving toward the piston relative to the clutch chamber.

2. The lock-up clutch assembly of claim 1, wherein the piston, the at least one friction plate, and the backing plate are coupled to the clutch chamber via the splines of the clutch chamber.

3. The lock-up clutch assembly of claim 1, wherein the at least some splines of the clutch chamber have a first thickness at a longitudinal position corresponding to the backing plate and a second thickness at a longitudinal position corresponding to the at least one friction plate, wherein the first thickness is less than the second thickness.

4. The lock-up clutch assembly of claim 1, wherein the outer diameter of the clutch chamber defines an annular recess, and wherein an annular retaining ring is received in the annular recess and prevents the backing plate from moving away from the piston relative to the clutch chamber.

5. The lock-up clutch assembly of claim 1, wherein the at least one friction plate has an inner diameter configured to be coupled to splines of a turbine.

6. The lock-up clutch assembly of claim 1, wherein the inner diameter of the clutch chamber does not define splines.

7. The lock-up clutch assembly of claim 1, wherein the clutch housing is configured to be coupled to a prime mover via a splined coupling.

8. A torque converter comprising:
    a rotating housing configured to be rotated by a prime mover;
    an impeller coupled to the housing and configured to rotate with the housing and pump fluid;
    a turbine configured to rotate as a result of fluid pumped by the impeller;
    an output shaft coupled to the turbine assembly and configured to be rotated by the turbine assembly; and
    a lock-up clutch assembly configured to selectively provide a mechanical coupling between the prime mover and the output shaft, the lock-up clutch assembly including:
    a clutch housing coupled to the rotating housing and defining an annular clutch chamber, the clutch chamber defining an inner diameter and an outer diameter;
    an annular piston received in the clutch chamber and extending between the inner diameter and outer diameter of the clutch chamber, the clutch housing and the piston defining a fluid chamber configured to receive fluid, wherein the piston defines an inner diameter and an outer diameter associated respectively with the inner and outer diameters of the clutch chamber;
    a backing plate received in the clutch chamber;
    at least one annular friction disk received in the clutch chamber between the piston and the backing plate;
    at least one annular friction plate received in the clutch chamber between the piston and the backing plate;
    a first seal member configured to provide a fluid seal between the inner diameter of the piston and the inner diameter of the clutch chamber;

a second seal member configured to provide a fluid seal between the outer diameter of the piston and the outer diameter of the clutch chamber, wherein the piston and the clutch housing are configured such that fluid received in the fluid chamber results in the at least one friction disc and the at least one friction plate being pressed together between the piston and the backing plate, such that the clutch housing and the turbine are coupled to one another via the at least one friction disc and the at least one friction plate, and wherein the outer diameter of the clutch chamber defines a plurality of radially extending splines that define a thickness and extend longitudinally from the piston to the backing plate, the thickness of at least some of the splines of the clutch chamber changing, such that the backing plate is prevented from moving toward the piston relative to the clutch chamber.

9. The torque converter of claim 1, wherein the piston, the at least one friction plate, and the backing plate are coupled to the clutch chamber via the splines of the clutch chamber.

10. The torque converter of claim 8, wherein the at least some splines of the clutch chamber have a first thickness at a longitudinal position corresponding to the backing plate and a second thickness at a longitudinal position corresponding to the at least one friction plate, wherein the first thickness is less than the second thickness.

11. The torque converter of claim 8, wherein the outer diameter of the clutch chamber defines an annular recess, and wherein an annular retaining ring is received in the annular recess and prevents the backing plate from moving away from the piston relative to the clutch chamber.

12. The torque converter of claim 8, wherein the turbine has an outer surface including splines, and wherein the at least one friction plate has an inner diameter coupled to the splines of the turbine.

13. The torque converter of claim 8, wherein the inner diameter of the clutch chamber does not define splines.

14. The torque converter of claim 8, wherein the clutch housing is configured to be coupled to a prime mover via a splined coupling.

15. The torque converter of claim 8, further including an end cap, wherein the output shaft includes a passage, and wherein the passage and the end cap provide flow communication with the fluid chamber of the lock-up clutch assembly.

16. The torque converter of claim 8, wherein the fluid chamber extends between the inner diameter of the piston and the outer diameter of the piston.

17. A method of increasing a torque transfer capacity of a torque converter lock-up clutch assembly, the method comprising:

providing an annular piston extending between an inner diameter and an outer diameter of a clutch chamber, wherein the piston defines an inner diameter and an outer diameter associated respectively with the inner and outer diameters of the clutch chamber;

providing seal members at the inner and outer diameters of the annular piston; and providing a splined coupling that extends longitudinally from the piston to a backing plate, the thickness of the splined coupling changing, such that the backing plate is prevented from moving toward the piston relative to the clutch chamber.

18. The method of claim 17, further including providing a splined coupling between the outer diameter of the piston and the outer diameter of the clutch chamber, and not providing a splined coupling between the inner diameter of the piston and the inner diameter of the clutch chamber.

\* \* \* \* \*